UNITED STATES PATENT OFFICE.

THOMAS B. JOSEPH, OF SAN FRANCISCO, CALIFORNIA.

METAL-LEACHING PROCESS.

No. 814,452.      Specification of Letters Patent.      Patented March 6, 1906.

Application filed August 23, 1904. Serial No. 221,866.

*To all whom it may concern:*

Be it known that I, THOMAS B. JOSEPH, a citizen of the United States, residing at San Francisco, in the county of San Francisco and State of California, have invented certain new and useful Improvements in Metal-Leaching Processes, of which the following is a specification.

My invention has reference to a metal-leaching process for extracting gold and silver from ore containing the same when in a suitable condition.

A special object of my invention is to provide a process for extracting said metals from the ore which can be used on base, oxidized, or other suitable ore, which will not be injuriously affected by the presence of soluble iron, arsenic, tellurium, or sulfur in the ore, and which will leach either roasted or unroasted ore, tailings, or ore slimes, either in stationary tanks or in revolving cylinders, without waste of cyanid by the action of soluble iron.

It must be understood that I cannot state definitely how fine the ore should be crushed, as loose-sand ore should be leached in its natural state unless the gold therein was coated over with a film of silica, in which case such sand ore should be pulverized finer to break through the silica films to enable the gold to be exposed to the metal-solvent solution. Soft ore should not be crushed as fine as hard or base ore, the fineness of crushing depending entirely upon the quality, impenetrability, and hardness of the ore to be leached. Some of the concentrated pyritic ore, if not roasted, should be ground to a fine powder of two hundred mesh or finer to the linear inch to get the best and quickest extraction.

In carrying out my invention after the ore has been properly prepared, as aforesaid, I subject the same to the leaching solution, containing water, sodium cyanid, hydrate of calcium, barium dioxid, ammonium bicarbonate, and compressed air, the compressed air being forced upwardly therein from the bottom from an air-compressor.

In carrying out my process it may be used in such vessels or tanks or revolving cylinders as have been found to be the most practical in the metal-leaching methods heretofore used.

If there were no carbon dioxid with the ammonia in this new solution, then the ammonia therein might decompose some of the cyanogen into its component parts and ruin its power to dissolve gold; but the carbon dioxid from the ammonium bicarbonate protects the cyanogen from such destruction. The cyanogen in this solution dissolves the precious metal, while the ammonium therein causes a better extraction of the silver as well as of the gold with this solution than the straight cyanid process would obtain. If there are any of the ferrocyanid of zinc, the ferrocyanid of copper, the zinc cyanid, the sulfo cyanid, or the ferrocyanids remaining in this solution, any of them are also good solvents of the gold therein, as the barium and compressed air will neutralize the injurious parts of sulfur and iron.

The leaching solution, containing water, sodium cyanid, hydrate of calcium, barium dioxid, and ammonium bicarbonate, is prepared in the storage-tank, or the ammonium bicarbonate or any one or more of the chemicals might also be dissolved in water and added into the leaching solution while on the leaching ore after the same has been partially leached, if desired.

Many of the injurious salts of iron, arsenic, or sulfur are readily oxidized by this process or transformed into compounds insoluble or inert as to the solution. This metal-solvent solution may be run into the ore several times to give the ore different leachings, if desired, and its upward inflow will generally give better results than the opposite direction.

The compressed air is conveyed upwardly in the tank of ore being leached in any approved manner for the purpose of agitating the ore, as well as to furnish plenty of oxygen and nitrogen therein to aid the work of the metal solvents in the extraction of the metals from the ore, and also to help to neutralize the soluble iron and sulfur or other injurious substances therein, as well as to help to protect the cyanogen, with its carbon dioxid, from the attacks of any soluble iron. The compressed air is also very beneficial to aid this solution during the extraction of the metals from ore-slimes when plenty of this solution is used. Great care must be taken, however, not to admit the compressed air under too great a pressure at the start in leaching ordinarily-prepared ore, as channeling of the ore might result, which would retard the leaching of the ore between the channels. Therefore the compressed air should be turned on slowly and its force be gradually increased to the desired amount. The compressed air is also beneficial to help to convey the slimes, if any therein, to the top to aid the percolation of the solution through the ore, as well as to help to transform some of the said injurious salts of iron, arsenic, and sulfur into the inert condition as to the solution. The compresed air prevents much of the unnecessary consumption of the cyanid and greatly increases the capacity of the mill by keeping the solution warm, imparting its heat of compression thereto, and from freezing in winter.

As it is expedient not to have any more of the cyanid-destroying compounds in the ore than can easily be helped, it is sometimes advisable to remove the cyanid-destroying compounds, if any therein, by washing the ore with water or with water and compressed air, or with lime-water, or with lime-water and compressed air before the leaching of the ore is commenced, and then use in the sodium-cyanid solution hydrate of calcium, barium dioxid, ammonium bicarbonate, and compressed air while the ore is being leached of its metals to neutralize any remaining cyanid-destroying compounds.

When it is desired to hasten the process of leaching or to prevent the solution from freezing in winter, the compressed air may be heated with steam or with a heating-furnace, through which a coil of the air-pipe passes, or by both methods, if desired.

I wish it to be understood as distinguishing between the use of calcium hydrate and oxid of lime, as I lay no claim to the use of oxid of lime, for the reason that the dissolving of the latter into the calcium hydrate when drowned in the leaching solution is so slow that the sulfur or arsenic in the ore might injure the cyanid solution or the cyanids of the precious metals before the oxid of lime was dissolved, thus rendering its use of but little or no benefit to neutralize the sulfur or arsenic in the ore until after they had done their harmful work.

Calcium hydrate, compressed air, barium dioxid, and ammonium bicarbonate in this solution immediately neutralizes the most of the baseness or refractory nature of the ore, and thereby prevents that injury to the cyanid solution. The calcium hydrate will form an insoluble compound with the arsenic if any is exposed on the ore, while the barium of the barium dioxid will form the insoluble barium sulfate with the free sulfur in the ore.

As a general rule there should be used in proportion to one ton of the water of the solution about two pounds of the sodium cyanid, about three to four ounces of ammonium bicarbonate, about three to four ounces of barium dioxid, and enough of the calcium hydrate to contain about one pound of the oxid of lime before being dissolved in the water in addition to the compressed air to be used therein while the ore is being leached, which compressed air can also be used in the solvent solution to give the same an aeration before it is run on the ore to be leached, if desired, though I do not limit myself to the exact amounts or proportions of the chemicals to be used to the ton of the water nor to the exact steps in the manner or mode of obtaining or mixing or using of the stronger or weaker solution, as a different proportion of the chemicals therein will be found beneficial on some ores, as circumstances may require. The addition of these chemicals thereto and the compressed air assist the leaching to such a degree that a less amount of sodium cyanid can be used than heretofore has been the custom on some ores, even where any dust of the oxid of lime or dry slaked lime has been added or scattered into the ore when the same was dumped into the tank to be leached in order to sweeten the same to prevent any bad odor that might afterward occur when taking out the tailings.

It must be understood that no hard or fast rules will be applied and that different conditions of ore must be considered in the successful work of this process.

When desiring to finish the leaching of a tank of ore, a wash-water should be run throughout it to wash out as much as is convenient of the remaining solution of the metals as may have remained therein and be saved to again be used as a wash-water or as a leaching solution, if desired, or for a part of it to be used to replenish to the normal quantity the stock solution, if wished, which latter should also have the strength of its chemicals replenished from time to time as desired to additionally leach the same or future ore. In this way the wash-water may be used over and over again as a wash-water as often as wished to wash the same or other ore by having its quantity increased after the metals are precipitated therefrom as desired, the pipes connecting the different tanks, pumps, and air-compressor being provided with stopcocks to control and regulate the flow of the different solutions and also the compressed air. In some cases it might be found advantageous to run this metal-solvent solution through a quantity of crushed limestone to more purify the solution by the absorption of the impurities into the limestone of one-half inch cubes, if desired.

To extract precious metals from powdered ores containing tellurium or arsenic or bismuth with this process, it will sometimes be found advantageous to first separate the arsenic or tellurium or bismuth therefrom by agitating the ore with compressed air or machine-stirring, or both, in a solution of water containing ferrous chlorid and overflowing them away from the ore to be leached instead of roasting out those injurious elements, which process is another one of my inventions.

When this process solution has been used to extract metals from ore-slime, one could afterward use salt water of a greater specific gravity to displace this metal solvent containing the dissolved metals therefrom or pass the solvent and slimes without filtering through quicksilver containing sodium amalgam to take out the precious metal, if desired, and then through a swift-running centrifugal mill to separate the slime-tailings from the solution either before or after running it through the sodium amalgam, if desired.

If at any time the precipitation of the precious metal is not quite as good as desired, it might be found advantageous to add more sodium cyanid or caustic soda or sodium sulfid, or both, or more of the hydrate of calcium to the ton of the metal solvent before trying to precipitate the metals therefrom to aid their precipitation.

The gold and silver may be precipitated by electricity or by filtering the metalline solution through spongy metals or metal shavings or finely-divided zinc or zinc shavings or by agitating the metalline solution with compressed air while adding zinc-dust or any finely-divided metals therein more electropositive than the gold or silver in the cyanid solution. However, I have no claim as to any special mode or means by which the metals to be saved shall be precipitated from this metal's solvent solution.

I lay no claim to the apparatus, nor do I claim, broadly, the use of compressed air, nor do I claim any particular mode of precipitating the metals from this solution, nor do I claim any particular source from which the elements in the solution are prepared or obtained from to be used in this process, as it may be obtained from any well-known non-injurious practical source; but What I do claim as new, and desire to secure by Letters Patent of the United States, is—

1. The herein-described process of extracting gold and silver from ore containing the same when in a suitable condition, which consists in subjecting said ore to the leaching action of an aqueous solution containing sodium cyanid, hydrate of calcium, barium dioxid, and ammonium bicarbonate, substantially as described.

2. The herein-described process of extracting gold and silver from ore containing the same when in a suitable condition, which consits in subjecting said ore to the leaching action of an aqueous solution containing sodium cyanid, hydrate of calcium, barium dioxid, ammonium bicarbonate, and simultaneously agitating the ore with compressed air, substantially as described.

In witness whereof I have hereunto set my hand in the presence of two subscribing witnesses.

THOS. B. JOSEPH.

Witnesses:
   FRANCIS M. WRIGHT,
   BESSIE GORFINKEL.